March 22, 1966     W. A. KUHRT     3,241,311
TURBOFAN ENGINE
Filed April 5, 1957
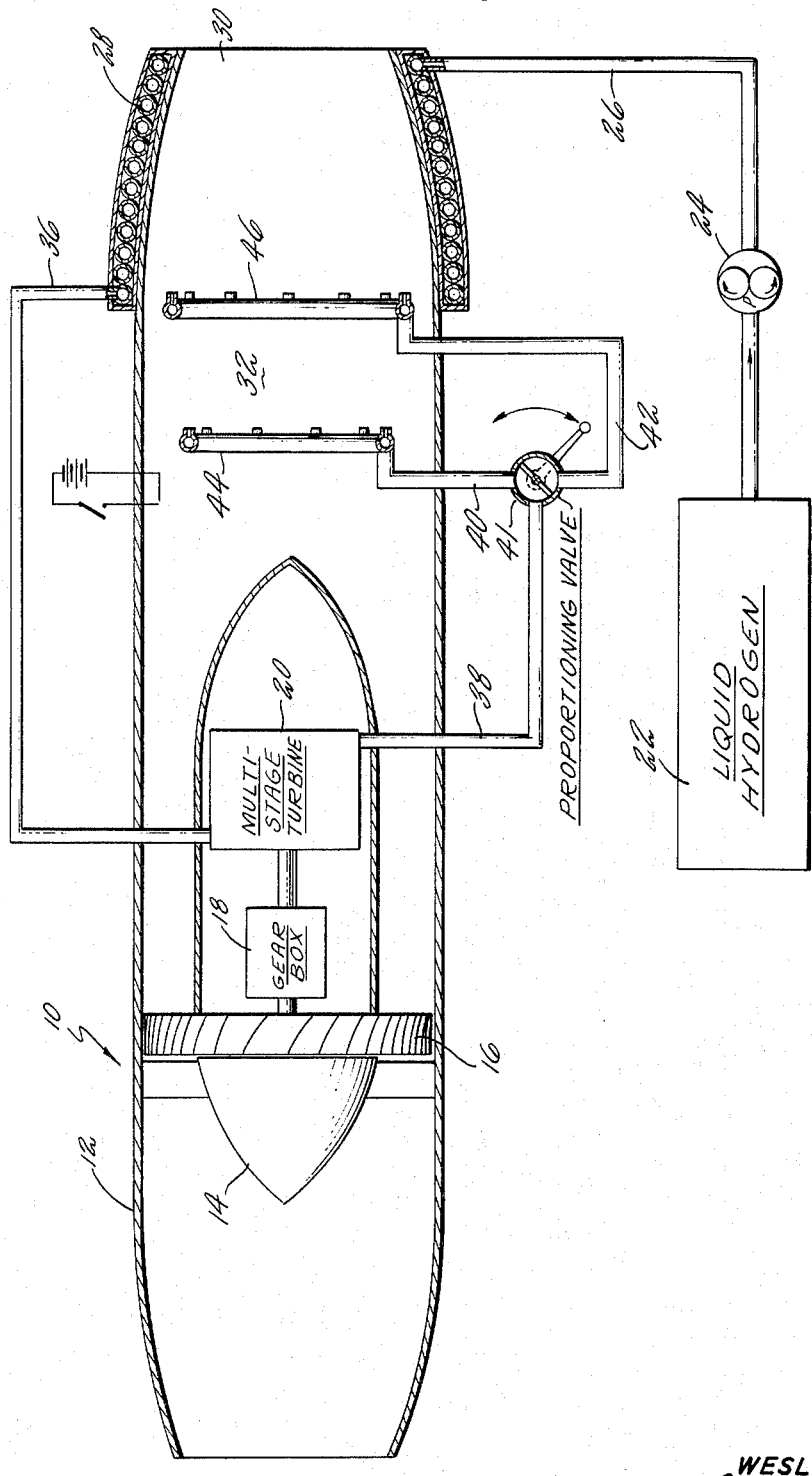
INVENTOR
WESLEY A. KUHRT
BY *Leonard F. Wakling*
ATTORNEY

3,241,311
TURBOFAN ENGINE

Wesley A. Kuhrt, East Glastonbury, Conn., assignor to United Aircraft Corporation, East Hartford, Conn., a corporation of Delaware
Filed Apr. 5, 1957, Ser. No. 650,908
1 Claim. (Cl. 60—35.6)

This invention relates to turbofan power plants and more specifically to turbofan power plants utilizing high energy fuels.

It is an object of this invention to provide a high thrust output turbofan power plant which utilizes a normally high energy gaseous fuel which is stored in a liquid state.

It is a further object of this invention to provide a power plant of the type described including a heat exchanger adjacent the exhause nozzle from which gasified fuel is conducted to a turbine which turbine extracts energy from the fuel to rotate the fan.

It is a further object of this invention to provide a power plant as described which subsequently burns the fuel exhausted from said turbine at a plurality of stations between said turbine and said exhaust nozzle.

These and other objects of this invention will become readily apparent from the following detailed description of the drawing, which is a schematic illustration of the power plant and cycle of this invention.

Referring to the drawing, a turbofan power plant is generally indicated at 10 as having an outer casing 12 and an inner body 14. The inner body 14 supports a single or multi-stage fan 16 which is driven through a gear box 18 by a multi-stage turbine 20.

Fuel for the power plant is in the form of a source of liquid hydrogen 22 which is pumped by a high pressure pump 24 via a line 26 to a heat exchanger 28 which surrounds an exhaust nozzle 30 and a portion of the combustion chamber 32. The heat exchanger 28 gasifies the liquid hydrogen from where it is conducted via line 36 to the turbine 20. The multi-stage turbine 20 extracts some of the energy from the gaseous fuel and exhausts the fuel into a line 38. The line 38 leads to a pair of pipes 40 and 42 which are connected to fuel manifolds 44 and 46, respectively. The fuel manifolds 44 and 46 are spaced along the axis of flow through the power plant so that with the use of proportioning valve 41 the release of heat energy may be more readily controlled. Each of the manifolds 44 and 46 act as a combined manifold, fuel injection and flameholder.

With the fuel manifolds 44 and 46 located in the manner shown, the size and extent of the heat exchanger 28 can be optimized to allow stoichiometric burning of the hydrogen without excessive heating of the metallic components of the combustion chamber and tail pipe. With hydrogen fuel being introduced at two stages in the combustion chamber, the major portion of the combustion chamber may be operated at normally acceptable temperatures and a small portion of the combustion chamber and the entire tail pipe or exhaust nozzle can be subjected to the maximum temperatures where these parts are protected by the tail pipe heat exchanger. The proportion of hydrogen introduced at each of the two stages (44, 46) is a function of the amount of heat necessary for the specific heat exchanger design and consideration of combustion characteristics of burning hydrogen.

It is apparent that as a result of this invention a high output power plant has been provided which can produce this power at high efficiency. Although the device herein may be slightly heavier than the device shown in patent application Serial No. 850,913 filed by me as of even date, now Patent No. 2,997,881, it will be more efficient and still substantially light.

Although only one embodiment of this invention has been illustrated and described herein, it will be apparent that various changes and modifications may be made in the structure and arrangement of the various parts without departing from the scope of this novel concept.

What is desired by Letters Patent is:

In a turbofan power plant having a central body and an outer casing, fan means carried by said body and including a hub and axial flow blading carried by said hub, a combustion chamber downstream of said fan for receiving air therefrom, an exhaust nozzle, a heat exchanger forming a part of the outer casing and adjacent said exhaust nozzle, a source of liquid hydrogen, a high pressure pump for pumping liquid hydrogen from said source through said exchanger to gasify the hydrogen, a turbine carried in said inner body downstream of said fan, means conducting the entire hydrogen flow from said exchanger to said turbine to utilize some of the energy to drive said turbine and expand said hydrogen, a gear reduction unit between said turbine and fan for driving said fan, two sets of fuel injecting nozzles receiving the entire exhaust of hydrogen from said turbine for injecting hydrogen into said combustion chamber at axially spaced stations at points downstream of said inner body, said first set of fuel nozzles being axially positioned between said inner body and said heat exchanger and said second set of nozzles being axially positioned adjacent to said heat exchanger, and means between said turbine and said nozzles for proportioning the relative amount of hydrogen flowing to each of said sets of nozzles to thereby vary the local temperature at axial positions along the exhaust nozzle axis.

References Cited by the Examiner
UNITED STATES PATENTS

| | | | |
|---|---|---|---|
| 2,483,045 | 9/1949 | Harby | 60—35.6 |
| 2,602,289 | 7/1952 | Anxionnaz et al. | 60—39.46 |
| 2,620,625 | 12/1952 | Phaneuf | 60—35.6 |

FOREIGN PATENTS

| | | |
|---|---|---|
| 918,316 | 10/1946 | France. |

MARK NEWMAN, *Primary Examiner.*

SAMUEL FEINBERG, SAMUEL BOYD, *Examiners.*